United States Patent [19]

Magarian

[11] 4,174,243
[45] Nov. 13, 1979

[54] METHOD AND APPARATUS FOR WIPING RESIN FROM FILAMENT WOUND PIPE

[75] Inventor: Gerald M. Magarian, Long Beach, Calif.

[73] Assignee: Ameron, Inc., Monterey Park, Calif.

[21] Appl. No.: 842,548

[22] Filed: Oct. 17, 1977

Related U.S. Application Data

[63] Continuation-in-part of Ser. No. 818,952, Jul. 25, 1977, Ser. No. 824,494, Aug. 15, 1977, and Ser. No. 842,624, Oct. 17, 1977.

[51] Int. Cl.² .......................................... B65H 81/00
[52] U.S. Cl. .................... 156/175; 118/106; 118/107; 118/DIG. 11; 156/425; 427/355
[58] Field of Search ............... 156/172, 169, 74, 175, 156/173, 425; 118/429, 103, 106, 107, 109, 125, 120, DIG. 11, DIG. 19; 427/177, 355, 345, 369, 356, 357, 358; 242/7.02, 7.21, 7.22, 7.23

[56] References Cited
U.S. PATENT DOCUMENTS

| | | | |
|---|---|---|---|
| 2,228,341 | 1/1941 | Cawthon et al. | 118/125 |
| 2,248,663 | 7/1941 | Flynn | 118/DIG. 19 |
| 2,843,153 | 7/1958 | Young | 156/175 |
| 3,030,914 | 4/1962 | Montgomery | 118/106 |
| 3,085,547 | 4/1963 | Stobierski | 118/109 |
| 3,182,632 | 5/1965 | Vazdikis | 118/106 |
| 3,781,107 | 12/1973 | Ruhland | 118/106 |
| 3,958,531 | 5/1976 | Warne | 118/106 |

OTHER PUBLICATIONS

Eshleman, "Flexible Rotor-Bearing System Dynamics, Critical Speeds and Response of Flexible Rotor Systems," 1972, The American Society of Mechanical Engineers, pp. 1 & 30.

*Primary Examiner*—Michael W. Ball
*Attorney, Agent, or Firm*—Christie, Parker & Hale

[57] ABSTRACT

Reinforced plastic pipe is made at high rates using a wiper to remove resin from the surface of the rovings after they are applied to a rotating mandrel. The wiper leaves an optimum surface layer of resin on the rovings. For small diameter pipe, production rates are further increased by rotating the mandrel above its first critical speed.

23 Claims, 9 Drawing Figures

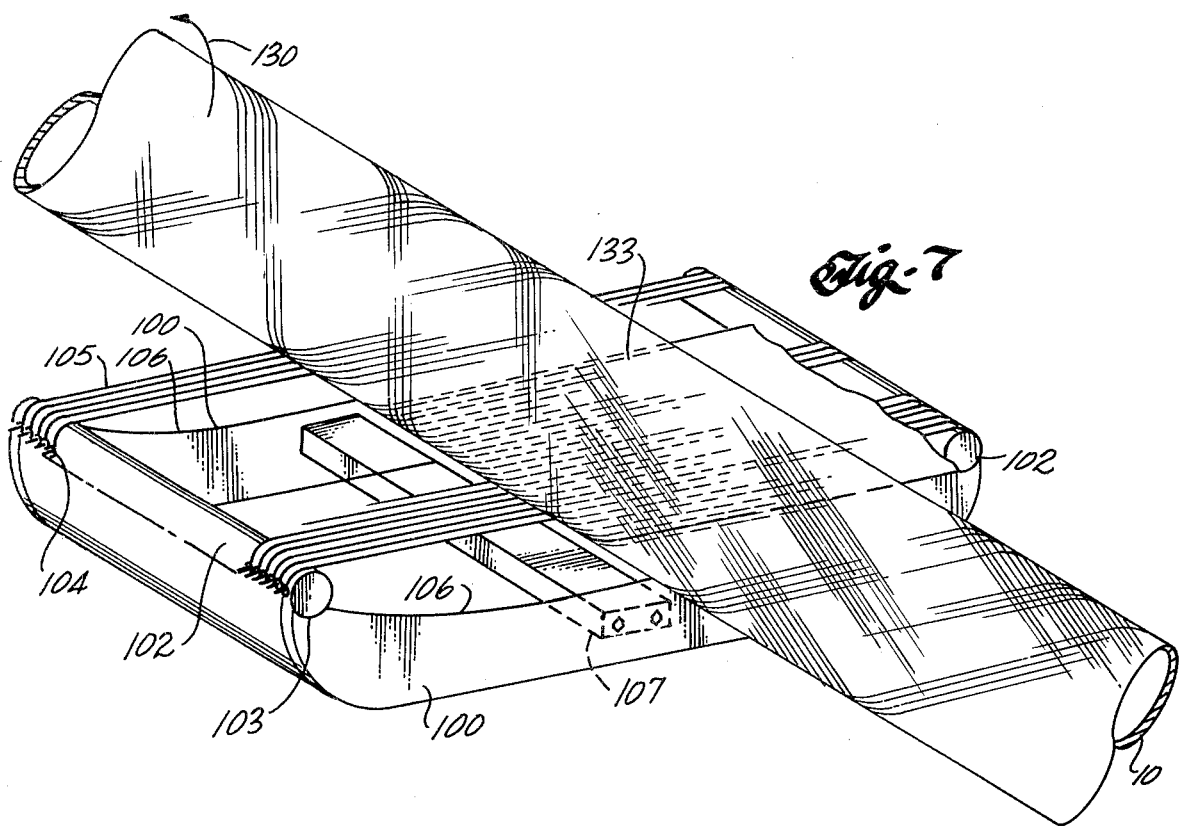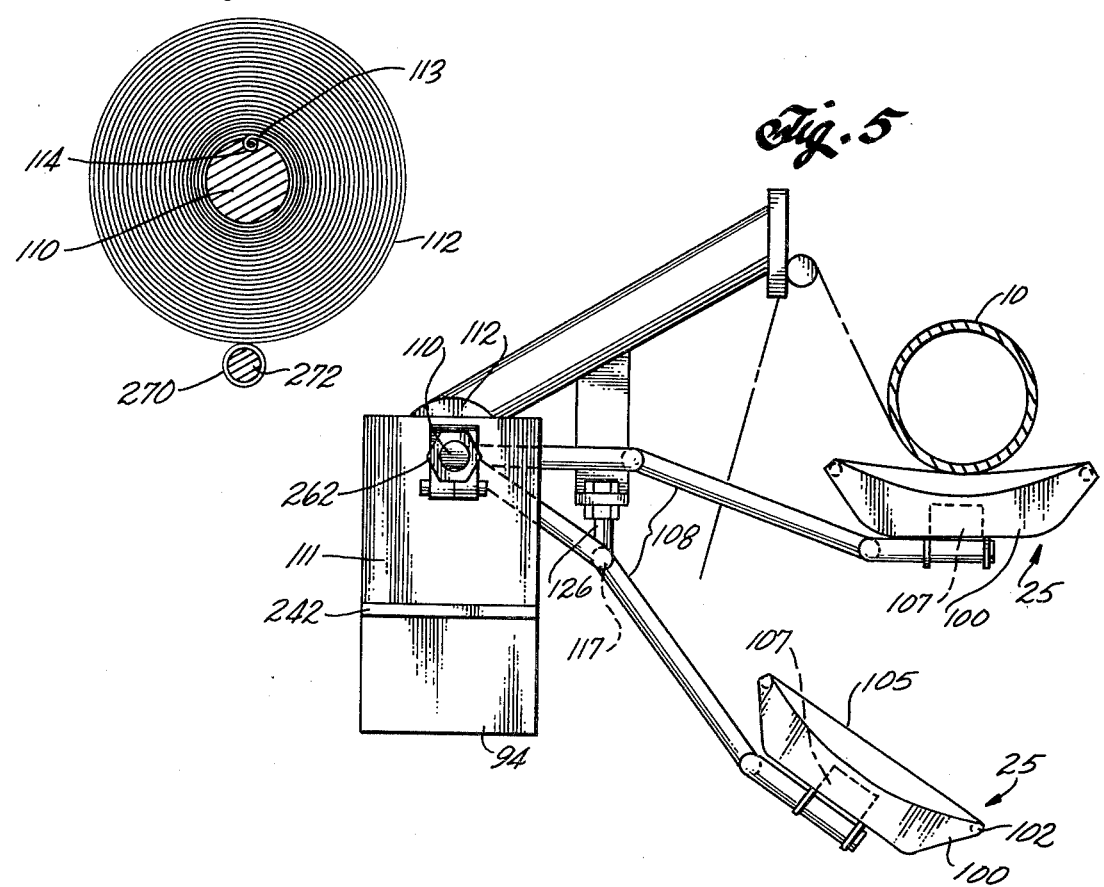

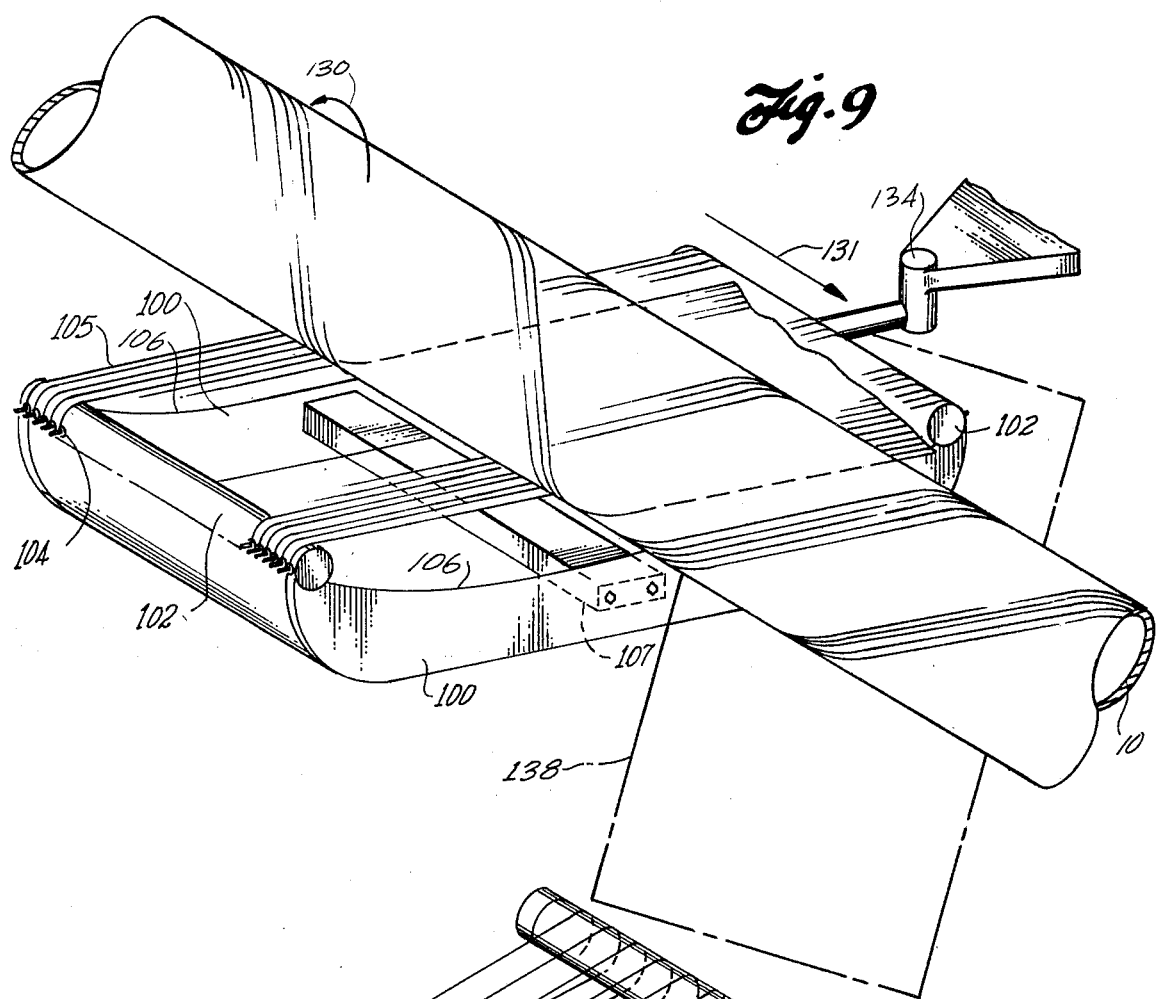
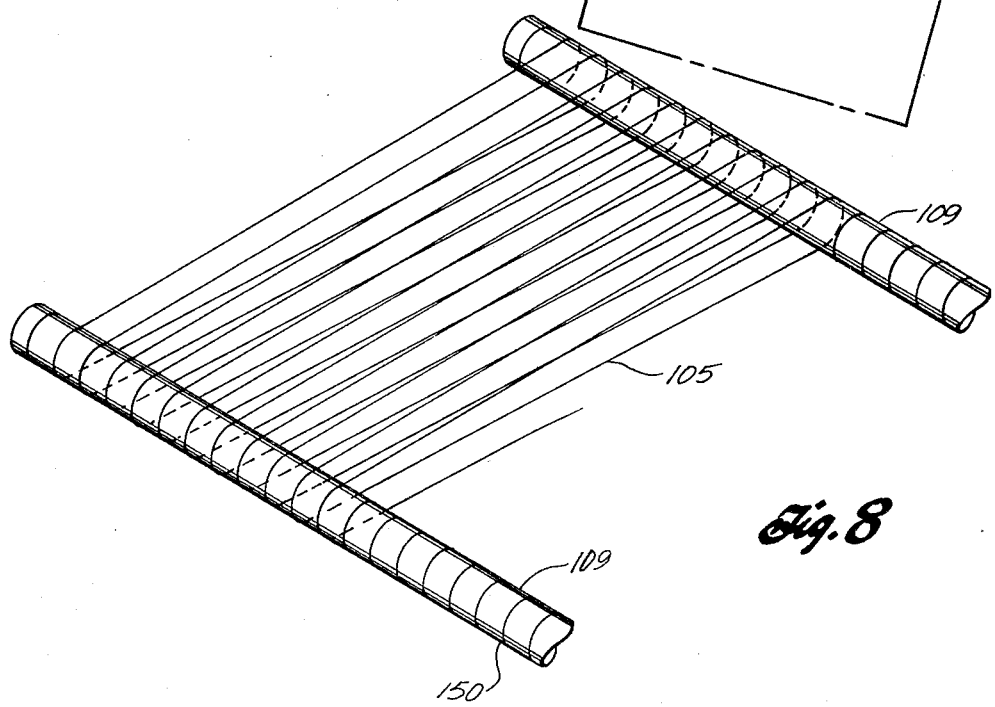

METHOD AND APPARATUS FOR WIPING RESIN FROM FILAMENT WOUND PIPE

CROSS REFERENCE TO RELATED APPLICATIONS

This application is a continuation-in-part of my co-pending applications, Ser. No. 818,952, filed July 25, 1977, entitled "impregnating a Fibrous Web with Liquid"; Ser. No. 824,494, filed Aug. 15, 1977, entitled "Producing Reinforcing Plastic Pipe with a Multi-Mandrel Machine"; and Ser. No. 842,624, filed Oct. 17, 1977, entitled "Stripping Plastic Pipe from a Mandrel".

BACKGROUND OF THE INVENTION

This invention relates to the art of manufacturing reinforced plastic pipe.

Fiber reinforced resin pipe and tubular articles are typically made by winding a band of reinforcing fiber rovings such as fiberglass on a rotating mandrel in a helical pattern with several superimposed layers. This is accomplished by drawing the rovings through a delivery head which runs to and fro along the length of the rotating mandrel. A high percentage of the glass reinforced plastic pipe used in the United States is produced by the wet winding process, where a band of rovings is drawn through liquid resin to impregnate and coat them with liquid resin before they are applied to the mandrel.

The production rate of reinforced plastic pipe in the wet winding process is limited by three factors. First, the rotating mandrel slings uncured resin. It is an inherent characteristic of the conventional wet winding process that the saturated band of rovings arrives at the mandrel with more resin than it can retain once it is on the mandrel. This excess resin is squeezed out to the surface of the band by the tension in the rovings immediately after the band contacts the mandrel. At high mandrel speeds the resin is slung. This tends to cause fouling of the equipment, danger to operating personnel and waste of valuable raw materials.

One means of preventing slinging is simply to rotate the mandrel at a speed well below the slinging limit and let the resin drip off the pipe during and immediately after the winding process as in U.S. Pat. No. 3,519,520. This drip method requires that the popular 2" and 3" pipe sizes be wound at low rotational speeds to avoid severe resin slinging. This last limitation directly reduces the productivity of the process. A further disadvantage of the drip method is that the drippings are normally collected in a long trough under the mandrel and eventually reused. Thus this method is obviously limited to use with resins with a very long pot life. In the case of a thermosetting epoxy resin, slung resin cannot be recycled to the process since it typically cures before it can be returned to the resin bath. Furthermore, the collected resin frequently must be reprocessed to replace lost volatiles, etc. before it can be reused. In addition, the long trough required tends to increase clean-up problems and is a fire hazard. Therefore, the drip method is unattractive, especially for the production of small diameter pipe.

Bradley discloses in U.S. Pat. No. 3,616,063 a pipe making machine with a rotating elongated roller provided with a continuous spiral thread throughout its entire length for compacting and arranging resin deposited upon the mandrel. According to Bradley's description, this apparatus only rearranges the resin, and does not remove excess resin applied to the mandrel. Therefore, Bradley's apparatus does not alleviate the resin slinging problem.

Another means of dealing with the excess resin is to remove it manually with a squeegee into a hand-held container during the winding process. The collected resin in this case can usually be returned directly to the resin bath for immediate reuse. However, this method is unsatisfactory because the squeegee has a solid blade which either removes too little or too much resin. If too little resin is removed, the resin slinging problem is not solved, heavy drippage during curing occurs, and the exterior of the cured pipe has an uneven surface. If too much resin is removed, there is an inadequate resin layer between layers of rovings. This can result in increase is void content of the pipe.

A high void content is undesirable because it increases the risk of damaging chemicals permeating the pipe wall structure or leaking completely through it. Thus, it is important to leave enough excess resin on the surface of rovings as they are wound to assure a dense structure. It is also desirable to leave a moderate excess of resin on the surface of the last layer of rovings to serve as a weather and scuff resistant coating for the finished pipe.

A second limitation on production rates is whipping and oscillation of the mandrel as the mandrel rotates at speeds approaching its critical speed. At moderate amplitudes these oscillations make accurate winding of the mandrel with the roving band impossible. At higher amplitudes these oscillations can damage the machine and can endanger the operator.

A third limitation on production rates is inability to impregnate rovings with resin at high speeds. For example, when impregnating fiberglass rovings with an epoxy resin, it has been found that at roving speeds above about 300 to 350 linear feet per minute, it is difficult to coat the rovings adequately with epoxy.

Which of these three factors actually limits the production rate of a given piece of pipe depends upon many variables, including the diameter and length of the mandrel, nature of the rovings, means of supporting the mandrel, temperature and viscosity of the resin, etc. Generally resin slinging and oscillations resulting from rotating the mandrel at speeds approaching the first critical speed limit production rates for pipe diameters up to about 5 inches.

The industry needs a method and apparatus for increasing the production rate of reinforced plastic pipe and which provide efficient recycling of excess resin.

SUMMARY OF THE INVENTION

I have now invented an improved method and an apparatus for manufacturing reinforced plastic pipe at increased production rates without resin slinging and which provide efficient recycling of excess resin.

My method comprises the steps of coating fibrous rovings with a fluid resin, winding a rotating mandrel with the resin coated rovings, and then wiping resin from the rovings after the rovings are wound onto the mandrel to leave an optimum surface layer of resin on the rovings. Preferably the rovings are wiped immediately after they are wound onto the mandrel. Resin wiped from the rovings can be collected and recycled to coat fresh rovings being applied to the mandrel.

An effective method of wiping resin from the rovings comprises contacting the resin with at least one filament segment, and preferably a plurality of substantially parallel, equally spaced-apart segments. To minimize damage to the rovings, the filament segments contacting the rovings preferably are substantially parallel to the longitudinal axes of the rovings.

It is preferred that the angle between the filament segments wiping the rovings and the longitudinal axes of the rovings be substantially constant. This ensures that an optimum layer of resin is left on the rovings, thereby yielding pipe with optimum physical properties with minimum material waste.

When the rovings are carried to and fro along the length of the mandrel and are helically wound around the mandrel so that the longitudinal axes of the rovings in one layer extend transversely to the longitudinal axes of the rovings in the adjacent layer, preferably the angle between the filament segments wiping the rovings and the longitudinal axes of the rovings being wiped is maintained substantially the same for all rovings by using two groups of filament segments or one group of filament segments pivotally mounted.

The method of this invention virtually eliminates resin slinging as a winding speed limitation for mandrels, thereby increasing production rate. When the wiping is accomplished with filament segments, an optimum surface layer can be left on the rovings, thereby yielding pipe of uniform quality with excellent physical properties.

This invention also contemplates a method of producing reinforced plastic pipe in which the mandrel is rotated at a speed above its first critical speed. It was surprisingly found that pipe making apparatus is not damaged if the speed of the mandrel is quickly accelerated to a speed between the first and second critical speeds.

This invention also contemplates an apparatus for removing resin from rovings after the rovings are applied to the mandrel to leave an optimum surface layer of resin on the rovings. This apparatus comprises at least one filament segment, means for supporting the filament segment, and means for pressing the filament segment against the rovings. Preferably the wiping apparatus includes a plurality of laterally spaced filament segments which are substantially parallel and uniformly spaced apart. For example, filament segments are placed in respective longitudinally spaced grooves in a filament support comprising elongated, substantially parallel, spaced-apart supporting bars or rods. Alternatively, the filament support comprises two substantially parallel, spaced apart bars having a plurality of knob-like projections with one or more filaments secured to the projections.

In a machine for manufacturing reinforced plastic pipe where the rovings are carried to and fro along the length of the mandrel by means such as a carriage, it is preferred that the angle between the long axes of the filaments and the axes of the rovings be constant as the carriage moves to and fro along the mandrel. This can be effected with a single pivotally mounted wiper or with two wipers alternately contacting the mandrel as the carriage changes direction as it moves along the mandrel. It is preferred that when two wipers are used the wipers be mounted on a chain-pulled carriage, and that the means for engaging and disengaging wipers comprises means for pressing the wipers against the rovings, a block mounted to slide on the carriage, a tiltable frame to which the wipers are secured where the frame is mounted on the carriage, and linkage means connecting the frame to the block. The block is secured to a chain link, and when the link reverses its direction of movement, the block slides on vertical rods in the direction transverse to the longitudinal movement of the carriage. The linkage means forces one of the wipers away from the rovings by overcoming the effect of the pressing means and allows the other wiper to contact the rovings. A spring-loaded roller engages a detent to hold the block and thus the wipers rigidly fixed relative to the axis of rotation of the mandrel as the chain link travels substantially parallel to the axis of rotation of the mandrel.

In a preferred embodiment of this invention the bath through which the rovings are pulled has an open top, is secured to the carriage, and is located beneath the mandrel at the position of contact between the filament segments of the wipers and the rovings so that any resin wiped from the mandrel falls into the resin bath. This permits automatic recycling and reclamation of excess resin applied to the rovings.

The method and apparatus of this invention have many advantages, including production of reinforced plactic pipe at rates hitherto not achieved because resin slinging is prevented and speeds greater than the first critical speed are attainable. Another advantage is that substantial savings in raw material costs are achieved because resin, which normally is slung from the rotating mandrel or left on the last layer, or manually removed from the last layer, is recovered and recycled. In addition, because the wipers leave a surface layer of resin of optimum thickness on the rovings, pipe of uniform quality, low void fraction and desired physical properties is produced.

DRAWINGS

These and other features, aspects and advantages of the present invention will become more apparent with respect to the following description of the invention, appended claims, and accompanying drawings where:

FIG. 5 is a view taken on line 5—5 of FIG. 4;

FIG. 6 is a view taken on line 6—6 of FIG. 4;

FIG. 7 is a detailed schematic view of a wiper in contact with rovings on a rotating mandrel;

FIG. 8 is a partial schematic view of a wiper with a grooved support; and

FIG. 9 is a partial schematic view of a pivotally mounted wiper.

DETAILED DESCRIPTION OF THE INVENTION

Figure 1:
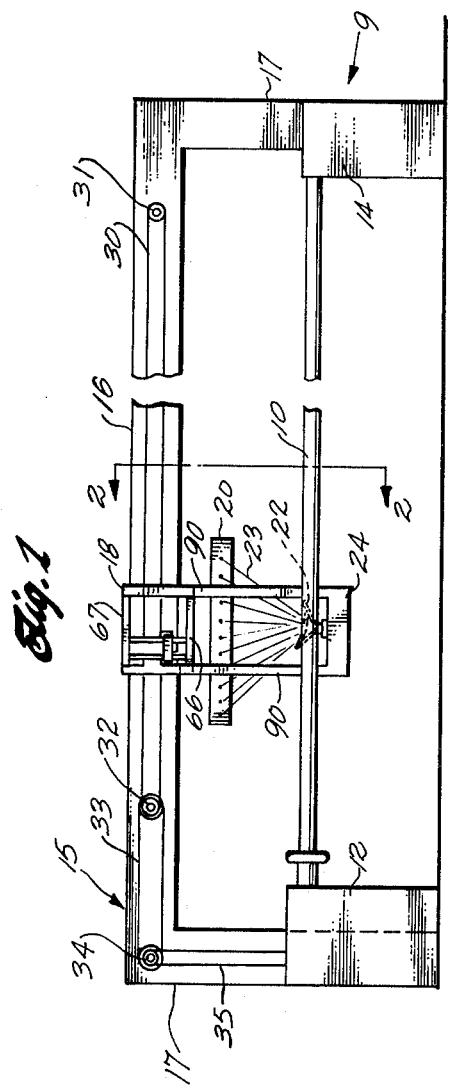
FIG. 1 is a side elevation of a pipe making machine showing the general relationship of the components of the machine.

Referring to FIG. 1, a pipe making machine 9 includes an elongated, horizontal, rotatable mandrel 10 journaled at one end in a headstock assembly 12 and at the opposite end in a tailstock assembly 14. An upright frame 15 includes an elongated, horizontal box girder 16 supported at its ends above the mandrel by respective vertical legs 17 mounted on the tail stock and head stock assemblies. A roving carriage assembly 18, which travels to and fro along the box girder 16, includes a bushing board 20 and a delivery ring 22 for applying rovings 23 to the mandrel, a resin pot 24 through which the rovings pass to become impregnated with resin, a wiping means 25 (FIGS. 2 and 3) for wiping resin from the rovings in accordance with the principles of this invention.

The rovings 23 with which this invention is useful are composed of substantially continuous, unidirectional fibers or filaments, and may take the form of mineral fibers such as glass or asbestos; animal fibers such as wool; vegetable fibers such as cotton; synthetic fibers such as nylon, rayon, Lacron, Orlon; and the like.

The resin or adhesive used to impregnate the rovings 23 can be any thermosetting or thermoplastic resin used in winding or laminating procedures. For example, this invention is useful with binders containing a thermosetting resin such as epoxy, polyester, melamine-formaldehyde, urea-formaldehyde, phenol-formaldehyde, or the like, or binders containing a thermoplastic resin such as polyvinyl chloride, polyvinylidene chloride, or the like.

The headstock assembly 12 comprises a conventional rotatable drive means (not shown) for rotating the mandrel 10 at a predetermined rate in coordination with the longitudinal rate of travel of the roving carriage assembly 18. The roving carriage assembly is pulled longitudinally by a first continuous drive chain 30 which travels over an end sprocket 31 and a first sprocket assembly 32 consisting of two sprockets mounted on a single stub shaft, both of which are attached to the elongated frame 16. The drive chain 30 is driven by a second, horizontally oriented, continuous drive chain 33 which travels over the first end sprocket assembly 32 and a second end sprocket assembly 34 consisting of two sprockets mounted on a single stub shaft which is pulled by a vertically oriented continuous drive chain 35 powered by the rotatable drive means which rotates the mandrel, thereby ensuring that the movements of the mandrel and the roving carriage assembly are coordinated.

Figure 2:
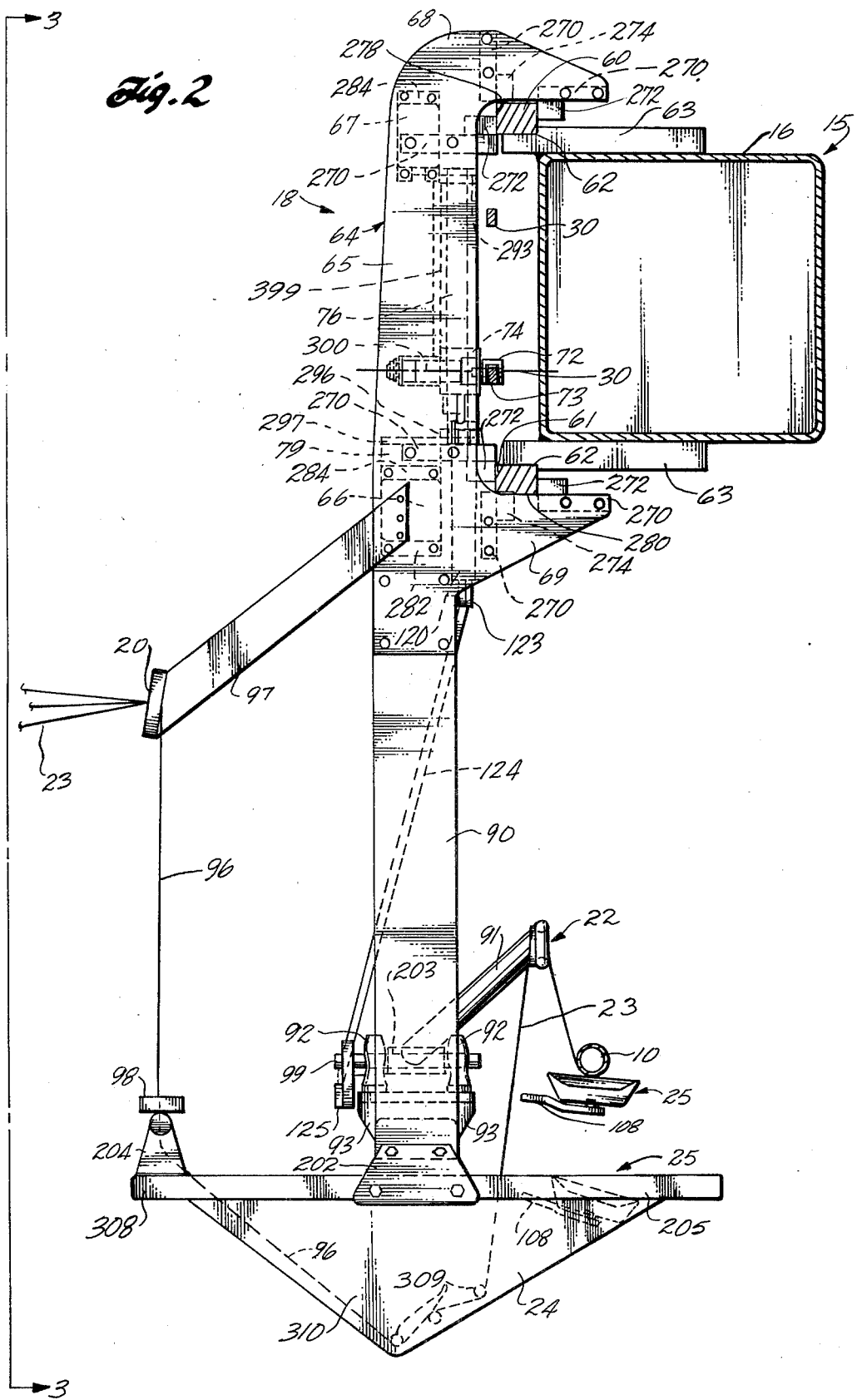
FIG. 2 is a view taken on line 2—2 of FIG. 1 of the roving carriage assembly.
Figure 3:
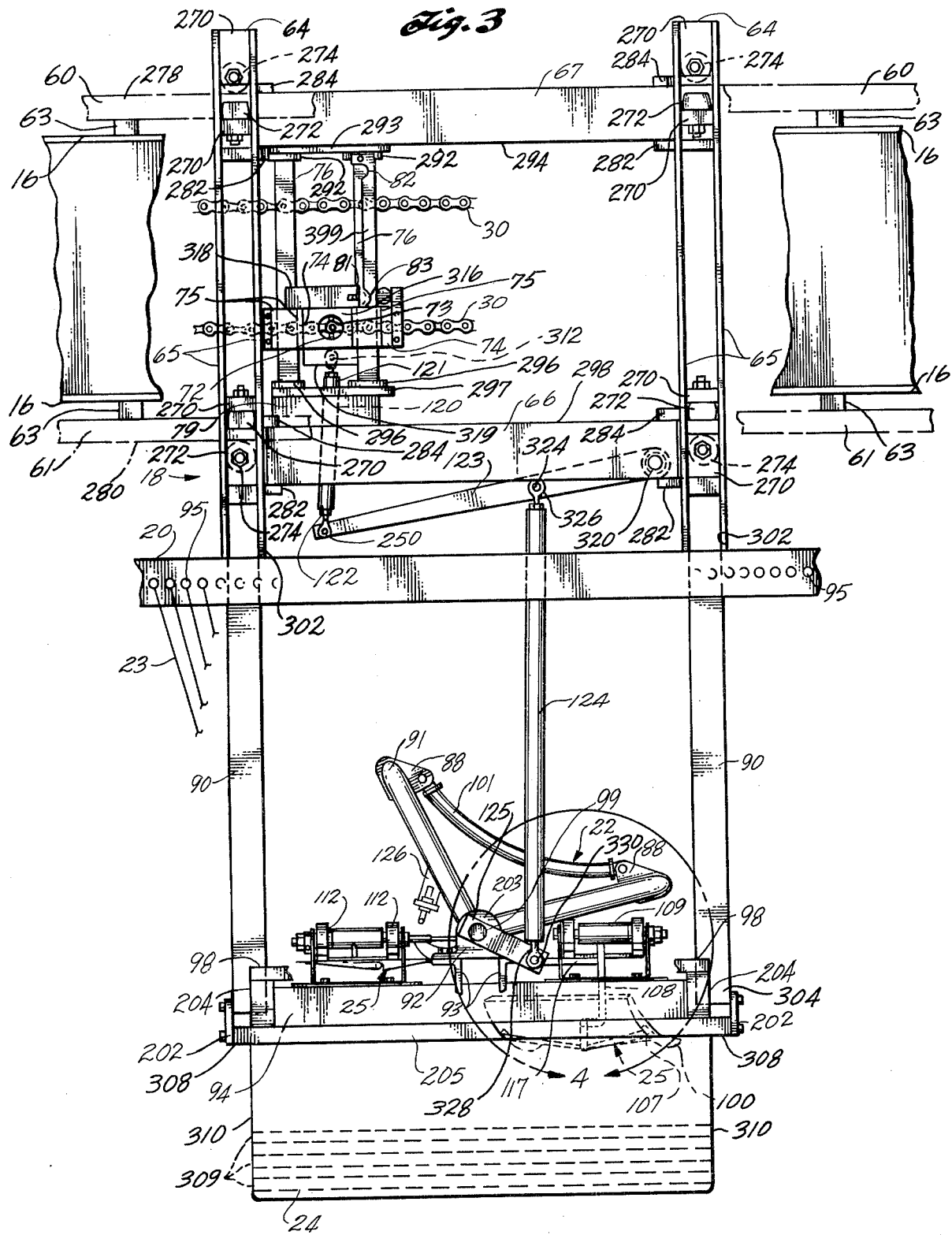
FIG. 3 is a view in partial section taken on line 3—'of FIG. 2 of the roving carriage assembly.

With reference to FIGS. 2 and 3, the box girder 16, along which the roving carriage assembly 18 travels, supports a pair of elongated, vertically-spaced apart horizontal rails, a top rail 60 and a bottom rail 61, each of which is welded to and carried in notches 62 of a plurality of cross bars 63 welded to the box girder 16.

The roving carriage assembly 18 comprises two C-shaped, vertically oriented frame members 64 each formed by a pair of parallel, spaced-apart, C-shaped plates 65.

Bolted between each pair of C-shaped plates 65 are six roller support plates 270 (a total of 12) which serve to keep each C-shaped plate 65 apart from the corresponding C-shaped plate. Each roller support plate also serves to support one of twelve rollers 272, 274 which enable the roller carriage assembly to travel along the rails 60, 61. The roller support plates are positioned so that each C-shaped frame member 64 has six rollers, a top set of three rollers which engages the top rail 60 and a bottom set of three rollers which engages the bottom rail 61. For each set of rollers, one side roller 272 rolls along one side of a rail, a second side roller 272 rolls along the opposite side of a rail, and the third roller 274 engages the top 278 of the top rail 60 in the case of the top set of rollers or the bottom 280 of the bottom rail 61 in the case of the bottom set of rollers.

The C-shaped frame members 64 are held spaced apart by two parallel, elongated, support beams, a lower beam 66 and an upper beam 67, the ends 280 of which are supported by two support blocks 282, 284 bolted to the inner C-chaped plates, one 282 below and one 284 above each beam 66,67. The upper 68 and lower 69 arms of the C-shaped frame members 64 extend over and under, respectively, the horizontal box girder 16.

The roving carriage assembly, which is pulled by a chain drive 30, is attached to the chain drive 30 by a U-shaped fastener 72, which grips a chain link on both sides. A cylindrical pin 73 is inserted through the chain link and both arms of the fastener. The fastener is mounted to rotate around a horizontal transverse axis 300 in a block 74. As the chain is pulled over sprockets 31, 32 at the ends of the box girder 16, only the chain fastener rotates, thereby permitting the remainder of the roving carriage assembly to maintain its orientation with respect to the mandrel.

The block 74 consists of a central block 316 in which the fastener is mounted and two smaller blocks 318, 319 welded to the top of and bottom of the central block 316, respectively.

As the chain drive pulls the carriage 18 along the rails, the chain reverses its direction of travel around the end sprockets 31, 32. The block 74 is slidably mounted with ball bushings 75 on cylindrical, vertical guide rods 76 to insulate the carriage from the vertical motion of the chain at the end sprockets. Each guide rod 76 is mounted in two collars, one 292 attached to a flat horizontal plate 293 welded to the underside 294 of the upper support beam 67 and another 296 attached to a flat horizontal plate 297 welded to a block 79 on the top side 298 of the lower support beam 66.

The block 74 is shown in FIGS. 2 and 3 in the position it occupies as it is pulled by a chain link travelling along the lower portion of the drive chain path. As the link moves around an end sprocket the link is pulled upward by the chain. The block 74, which is mounted to slide on the guide rods 76, follows the path of the linkage without affecting the orientation of the rest of the roving carriage assembly. The block 74 undergoes sinusoidal motion at the ends of the chain path due to its combined vertical and horizontal motion, and is at the mid-point of the guide rods 76 only when the chain link to which the block is attached is at an extreme end of the chain path.

A cam roller 81 attached to the block 74 is spring-loaded to engage a detent 82 at the top of a detent bar 399 when the block 74 is in its uppermost position, and a lower detent 83 in the detent bar 399 is at its bottom position as shown in FIG. 3. Because the block is rigidly held in a detent, slack in the chain does not affect the position of the block. Only the forces at the end sprockets where the block reverses direction are sufficiently large to disengage the spring-loaded cam roller 81 from the detents. Therefore, the relative position between the rovings, wipers, and mandrel remains essentially unchanged as the roving carriage assembly is pulled along the box girder 16, thereby ensuring uniform wiping of resin from the rovings and uniform winding of the rovings around the mandrel.

An elongated column 90 is sandwiched between and bolted to the bottom portion 302 of each pair of C-shaped plates 65. The columns 90 support the apparatuses used for coating and feeding the rovings, including the resin pot 24, delivery ring 22 and wipers 25. Suspended from a pair of vertically oriented plates 202, one of which is attached to the bottom portion 304 of each of the columns 90, is the trough shaped resin pot 24 which holds the resin used for coating the rovings. The resin pot has a rim 205 projecting outwards at the top of the pot, the rim being bolted to the plate 202. The delivery ring 22 comprises a uniformly curved, smooth-surfaced round bar 101 bolted at both ends to ears 88 welded to a V-shaped frame member 91 which is welded at the apex to an enlarged portion 203 of a horizontal shaft 99 which extends toward the mandrel and is mounted in pillow blocks 92. The pillow blocks 92 are supported by angle irons 93 attached to a horizontal cross-beam 94 bolted to and extending between the bottoms of the tubular columns 90.

The rovings 23 to be impregnated with resin are pulled through a bushing board 20, which is a flat, elongated, horizontal board with a pluralty of holes 95. A single strand of roving is pulled through each hole 95. The path of the rovings is shown by line 96 in FIG. 2. The bushing board 20 is suspended from a pair of struts 97, one of which is bolted to and projects from each of the outer C-shaped plates 65. The rovings are then drawn through an elongated horizontal comb 98 which is parallel to and positioned below the bushing board and mounted on top of suppots 204 welded to the corners 308 of the rim 205 of the resin pot 24 below the bushing board 20. The comb spaces the rovings properly as they enter the resin pot 24. Next, the rovings pass alternately over and under a series of three horizontal, cylindrical bars which are generally parallel with the comb and are welded to the bottom portion of opposing walls 310 of the resin pot 24 to become coated with resin. The resin coated rovings are then pulled over the curved delivery ring bar 101, and then are helically wound about the rotating mandrel 10, the helix being formed by the combination of the rotation of the mandrel and the lateral movement of the roving carriage assembly. Preferably the helix angle is about 54 degrees to provide optimum strength to the reinforced plastic pipe.

Also mounted on the horizontal cross-beam 94 are two wipers 25, only one of which at any given time is wiping resin from the rovings. Each wiper 25 comprises at least one filament segment means for supporting the filament segment, and means for pressing the segment into contact with the rovings.

As shown in FIG. 7, the supporting means of each wiper comprise two substantially parallel, spaced-apart end plates 100 connected by a pair of substantially parallel rods 102 welded to the top corners 103 of the end plates. The rods have uniformly spaced-apart knob-like projections 104. A plurality of uniformly spaced-apart filament segments 105 is secured to the projections 104, and extends between the rods 102, thereby forming a single layer of filament segments. The top edge 106 of the end plates is concavely curved away from the filament segments so that only filament segments and not the end plates engage the rovings. A cross bar 107, which provides the mounting point for the wiper framework, extends between and is bolted to the middle of both end plates 100.

Another embodiment of a wiper is shown in FIG. 8. In this embodiment the supporting means for the filament segments are a pair of elongated, substantially parallel rods or bars 109 which have longitudinally spaced circumferential threads or grooves 150. One or more filaments are wrapped around the rods and positioned within the grooves, thereby providing a double layer of uniformly spaced-apart, substantially parallel filament segments. Compared to a single layer of filament segments, it is believed that a double layer wipes off less resin from the rovings because some of the resin wiped by the first layer is collected by the second layer and then reabsorbed by the rovings.

In order to minimize damage and breakage of the rovings during the wiping, it is preferred that nylon monofilament fishing line secured to the side bars under moderate tension be used for the first filament segments. Nylon fish line has been found to cause little damage to resin soaked rovings. Use of only moderate tension allows the filament segments to conform to the curvature of the pipe as shown in FIG. 5, without damaging the rovings.

Figure 4:
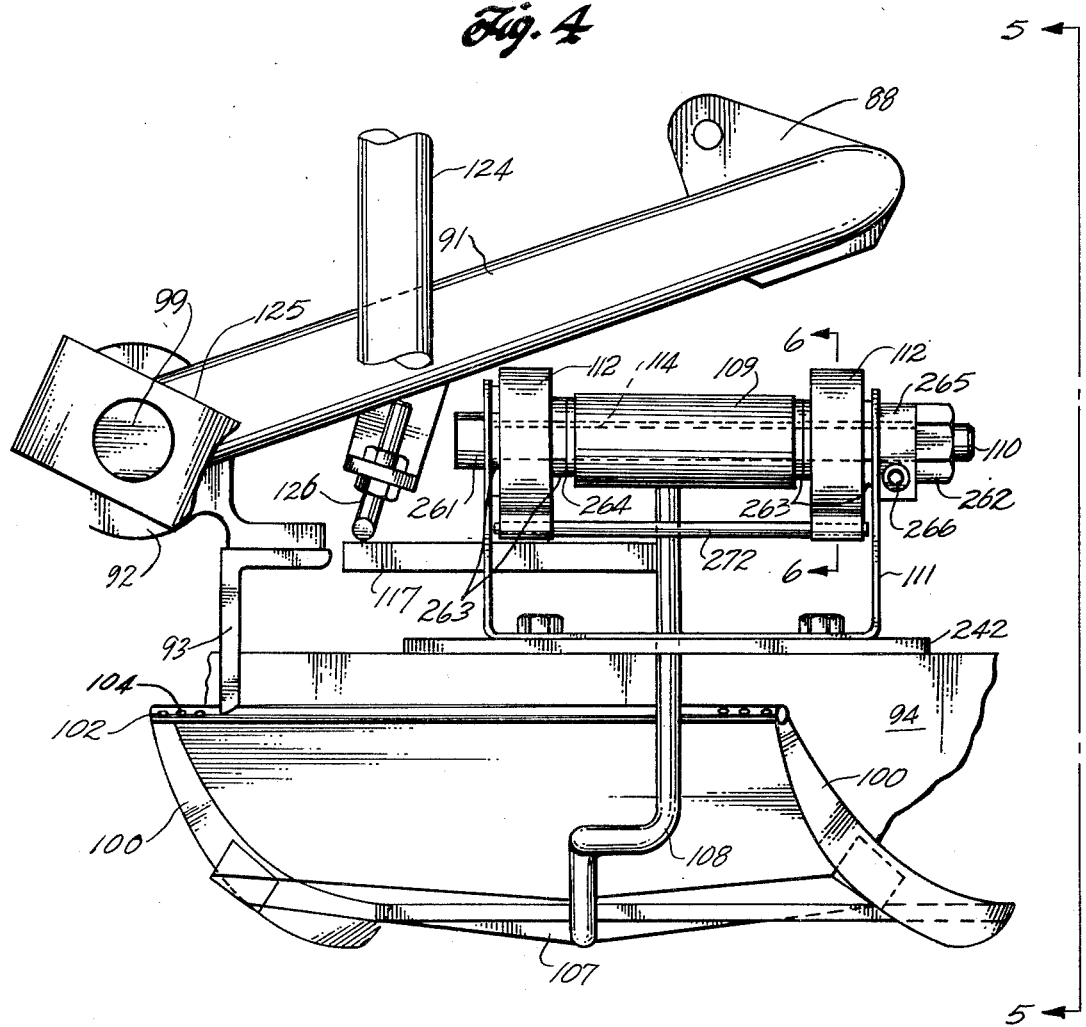
FIG. 4 is a detailed view in partial section of the area 4 of FIG. 3.

As shown in FIGS. 4, 5 and 6, the means for pressing filament segments into contact with the rovings comprises an elongated lever arm 108 welded at one end to the wiper cross bar 107 and at the other end to a tubular mounting piece 109 which is oriented so that the axis of the tubular piece is perpendicular to the longitudinal axis of the lever arm. The tubular mounting piece 109 is mounted on a horizontally oriented pin 110, the axis of which is perpendicular to the axis of the shaft 99 on which the delivery ring 22 is mounted. Thus the lever arm 108 and the wiper extend toward the mandrel and away from the delivery ring 22. The pin 110 on which the lever arm 108 is mounted is supported at its ends by a frame 111 bolted to a plate 242 on the surface of the cross beam 94. The pin 110 is prevented from sliding out of the frame 111 by means of a split collar 265 welded to the frame 111, where the collar 265 can be clamped tightly on the pin 110 by tightening a clamp bolt 266. A nut 261 is welded to one end of the pin and a second nut 262 threaded on the pin at the opposite end. Any excess slack on the pin is taken up by washers 263.

A pair of flat spiral springs 112 is mounted on the pin 110. A projecting tang 113 on the innermost coil of the spring 112 fits into a longitudinal slot 114 on the surface pin 110. Supported by the loops 270 is a cylindrical horizontal pressing bar 272.

The flat spiral springs 112 are responsible for pressing filament segments into contact with the rovings. In operation the springs are coiled by turning the pin 110 by means of the nut 261 welded to one end of the pin while holding the pressing bar 272 stationary to preload the springs to press the wiper assembly 25 against the pipe on the mandrel with the desired force.

With the nut 261 still held to prevent rotation of pin 110, the nut 262 is tightened until the axial squeeze it applies to all components between the two arms of frame 111 produces the desired frictional resistance to rotation of tubular mounting piece 109. Then, the clamp bolt 266 is tightened, which clamps the collar 265 securely onto the pin 110 to hold both the angular setting of the pin 110 and the axial squeeze on all components between the arms of the frame 111. Friction caused by the axial squeeze provides damping to keep the wiper assemblies from bouncing when traversing along rapidly rotating mandrels. The disc springs provide compliance so the desired axial squeeze force and hence the friction damping will be adequately retained in spite of small amounts of wear on squeezed-together surfaces.

Because the spring is keyed into the slot 114 in the pin, the spring is prevented from uncoiling. The pressing bar 272 presses against the lever arm 108 causing the wiper assembly to rise and press against the rovings on the mandrel. The amount of force can be controlled by increasing or decreasing the tension on the springs 112.

Although only the pressing means for the right hand wiper is shown in FIG. 4, the same mechanism as described above is used for the left hand wiper. Thus both wipers are pressed simultaneously toward the rovings by a pair of springs 112.

The means for pressing only one wiper at a time against the rovings is most clearly shown in FIGS. 3 and 4. As the block 74 slides down the guide rods 76 to the position it occupies shown in FIG. 2 as the chain link to which the block is attached travels around an end sprocket, a vertically oriented link 120, the top end 121 of which is pivoted on a horizontal pin 312 projecting out of the bottom block 319 of the block 316, is forced downward. Mounted on a pivot shaft 250 projecting through the bottom end 122 of link 120 is one end of a horizontally oriented lever 123, the opposite end of which is pivotally mounted on a pin 320 projecting horizontally from the lower elongated beam 66. As the block 74 slides downward, the lever 123 pivots downward to the position shown in FIG. 3. Attached to a pin 324 projecting from the mid-section of the lever 123 is a rod end 326 attached to an elongated, vertically oriented link 124 which mimics the up and down motion of the block. At the opposite end of the link 124 is another rod end 328 mounted on a pin 330 attached to a crank 125 which is secured to the pivot shaft 99 of the V-shaped frame 91 supporting the curved bar 101 of the delivery ring 22. Each of the arms of the V-shaped frame 91 has a separate lug 126 which projects downwardly towards and can engage one end of a horizontal extension 117 secured at its other end to the mid-section of the lever arm 108 of each wiper. When a lug 126 engages a horizontal extension, the entire wiper 25 is rotated around pin 110 downwards due to the net moment created by the tilt ring pressing on the horizontal extension 117 at the mid-section of the lever arm 105.

In operation, as the lug 126 on the right arm of the V-shaped frame 91 forces the wiper on the right side down away from the mandrel 10, the coiled springs 112 force the filament segments on the left side up against the mandrel. When the block 74 rises to its uppermost position, the link 120, the lever 123, and the link 124 attached to the crank 125 are pulled upward. This tilts the delivery ring 22 toward the wiper 25 on the left side, and the lug 126 on the left side of the V-shaped frame 91 forces the extension 117 of the left side wiper lever arm 108 and thus the left side filament segments away from the mandrel while the wiper on the right side engages the rovings on the mandrel. Therefore as the roving carriage assembly changes directions as it moves to and fro along the mandrel, the wipers alternately engage the rovings.

The advantage of using two wipers, only one of which engages the rovings at any given time, is that a constant angle is maintained between the long axes of the filament segments and the axes of the rovings as the rovings are helically wound onto the mandrel. As the roving carriage assembly travels reciprocatingly longitudinally along the mandrel subsequent layers of rovings are transverse to each other. If there were only one wiper, the angle between the filament segments and the rovings would change depending upon the directon the carriage assembly is moving. As discussed more fully below, the angle between the filament segments and the roving is important in controlling the amount of resin wiped from the rovings and the quality of the product pipe.

An alternate means for maintaining a constant angle between the rovings and the filament segment using one wiper which pivots around a pivot point 134 is shown in FIG. 9. The position of the wiper in FIG. 9 corresponds to a mandrel rotating in the direction shown by the arrow numbered 130 with the roving carriage assembly moving in the direction shown by the arrow numbered 131. The filament segments 105 naturally line up with the rovings 133 so that the net moment of rotation through the swivel point 134 is zero. When the roving carriage assembly switches direction, the next layer of rovings is transverse to rovings 133, and the wiper rotates about its swivel point 134 to the position shown by the phantom line numbered 138.

As shown in FIG. 7, it is preferred that the wiper removes resin from the surface of rovings almost immediately after the rovings are wound on the mandrel. This minimizes the amount of resin slinging and accomplishes immediate return of excess resin to the resin bath.

It also is preferred that the wiper trails the rovings when the rovings are applied in bands without space between adjacent bands. This insures that when the first layer of rovings is applied, the delicate underlying layer of glass surface mat or veil which is used with some types of reinforced plastic pipe is not damaged by the filament segments.

An advantage of the wipers having filament segments as described above is that they leave a layer of resin having a controllable thickness on the surface of the rovings. This is uplike conventional doctor blades or hand held squeegees which can wipe too much or too little resin from the surface of the rovings. It is important to maintain an optimum surface layer of resin on the rovings to eliminate slinging while still producing pipe with a low void content. An optimum surface layer of resin is a layer which does not cause slinging or dripping, which produces pipe with low void content, and in the case of the final layer of rovings, provides a desired resin-rich surface without causing an uneven surface finish.

The thickness of the layer is easily controlled with the wipers of this invention by changing the angle between the filament segments and the rovings being wiped. Maximum removal of resin is obtained where the filament segments are perpendicular to the axes of the rovings. Conversely, minimum removal of resin is obtained where the filament segments are substantially parallel to the axes of the rovings.

A factor encouraging the use of small angles for pipe is the susceptibility to tearing of the veil layer which often is wrapped around the mandrel. In the manufacture of large diameter pipe, i.e., pipe of about 4 inch nominal diameter and up, the veil may not be completely covered by rovings during the first pass of the rovings. Therefore, filament segments are in contact with some of the veil during the first pass. When the angle between the filament segments and the rovings approaches 90 degrees, the filament segments are also transverse to the veil layer. This tends to cause damage to the veil layer, and since the veil layer provides corrosion resistance when the pipe is used for corrosive fluids, a pipe with a damaged veil layer is unacceptable.

The amount of resin wiped from the rovings is controlled by other factors in addition to the angle between the rovings and filament segments. The most important of them are the diameter and spacing of the filaments. By manipulating these variables, it is usually possible to obtain the desired degree of wiping with the filaments approximately parallel to the rovings.

The part of the mandrel engaged by the wiper also affects the amount of resin wiped from the rovings.

When a wiper contacts the rovings toward the top of the mandrel, no resin is removed, because all of the resin wiped from the rovings is redeposited on the rovings as it flows down the sides of the mandrel towards the resin pot. For example, more resin is wiped from the rovings when a wiper engages the mandrel a little off the extreme bottom area toward the side of the mandrel rotating away from a resin pot positioned below mandrel. Less resin is removed when the wiper engages the mandrel on the opposite side of the extreme bottom position. This occurs because gravity counteracts the tendency of the wiped resin to be reapplied to the surface of the rovings before it can drain off the wiper when the wiper is in the former position.

When the method and apparatus discussed above are used for manufacturing reinforced plastic pipe, increased production rates are obtained. However, although resin slinging is eliminated or at least substantially reduced, oscillations at mandrel rotating speeds approaching the critical speed are still a problem. For example, for a two inch diameter mandrel with a 30 foot winding length fixed at the ends of the mandrel with long rigid bearings, both resin slinging and the first critical speed limit production rates.

Surprisingly, I found that it is possible to produce reinforced plastic pipe at high rates by rotating the mandrel at speeds above the first critical speed, if the mandrel speed is quickly raised through the first critical speed range. It is important to raise the speed of the mandrel as quickly as possible to prevent the oscillations which occur in the region of the critical speed from becoming serious enough to damage the mandrel and other pipe making equipment.

The use of supercritical speed and wipers is particularly effective in raising the production rate of small diameter pipe. Since critical speed is proportional to the diameter of the pipe, the critical speed is lower for a small diameter mandrel than for a large diameter mandrel. The tendency to sling resin is inversely proportional to the diameter of the mandrel, and thus a small diameter mandrel has more tendency to sling resin than a large diameter mandrel. Therefore in the case of a two-inch diameter mandrel with a 30 foot winding length supported with moment fixity, both oscillations at the critical speed and resin slinging limit production rates. However, when wipers embodying features of this invention are used and the mandrel is rotated at a speed above its first critical speed, production rates are achieved at mandrel speeds which provide a 2 to 3 fold increase in production rates. This obviously confers a major economic advantage. This production rate, which is close to the limit imposed by the second critical speed mode oscillations, is also close to the limitation imposed by roving wetting.

When producing three inch diameter pipe with the method of this invention, the limit on production rate is roving wetting. This limit occurs after the first critical speed, but well below the onset of second critical speed mode oscillations.

For 4 inch and larger mandrels having a winding length of about 30 feet and fixed at both ends with long rigid bearings, when a method embodying features of this invention is used, production is limited by resin wetting. This limit is reached before the first critical speed.

Therefore, it is preferred that when manufacturing pipe of up to about 3 inches in diameter that both the step of rotating the mandrel above its first critical speed and the step of wiping resin from the rovings to leave a uniform surface layer of resin on the rovings be practiced simultaneously. This results in the production of reinforced plastic pipe at rates limited only by the rate at which the rovings are wetted with resin.

For pipe of about 4 inches in diameter and larger, since the limitations on production rate typically are roving wetting, followed by resin slinging, and then oscillations as the first critical speed mode is approached, only the step of wiping resin from the rovings is provided when mandrels of the length and support means specified above are used. Such wiping eliminates the need to spend time manually squeegeeing pipe after is wound, and thereby reduces the time required to complete pipe.

It is preferred that in practicing this invention mandrels fixed at both ends with long rigid bearings be used. This serves to about double the first critical speed because there is less sag of the mandrels.

The apparatus and method of this invention serve not only to increase production rates, but also to conserve raw materials and improve the quality of pipe produced. Raw materials are conserved because resin wiped from the rovings is directly collected in the resin pot and recycled to coat additional rovings. Even when using resins, such as some epoxies, that start to cure at roving winding temperatures, the resin can be reused before it hardens. This is unlike other resin collection methods wherein the resin is allowed to drip into a trough, and then is returned to the resin feed mechanism, such as the method described in U.S. Pat. No. 3,519,520.

Pipe quality is improved by the apparatus and method of this invention because an optimum controllable layer of resin is continuously left on the rovings.

This invention has been described with reference to preferred embodiments. However, other embodiments of the invention are useful for practicing the invention. For example, instead of using two wipers or one pivotally mounted wiper for effecting a constant angle between the filament segments and the rovings, a single fixed wiper may be used where the filament segments and not the supporting means rotate to maintain a constant angle. Alternatively, wiping can be effected without maintaining a constant angle. Although this does not result in as uniform a layer of resin on the surface of the rovings, this method does prevent resin slinging.

This invention may be used not only in a single mandrel pipe making machine, but also in multi-mandrel pipe machines such as the merry-go-round type configuration shown in FIG. 17 of U.S. Pat. No. 3,616,063, or where the mandrels are mounted on a single frame in a ferris wheel type configuration, as described in my copending U.S. patent application, Ser. No. 824,494, filed on Aug. 15, 1977, and incorporated herein by this reference.

Although the drawings show a mechanism for causing the wiper to alternately engage the rovings utilizing a tilting delivery ring, it is possible to achieve the same results by using a tilting bar and maintain the delivery ring stationary.

Because of variations such as these in the preferred embodiments, the spirit and scope of the appended claims should not be necessarily limited to the description of the preferred embodiments.

I claim:

1. In a method for manufacturing plastic pipe reinforced with fibrous rovings comprising the steps of coating the rovings with a fluid resin, and winding a rotating mandrel with the resin coated rovings, the improvement which comprises the step of contacting the wound rovings with at least one filament segment curved around a portion of the wound pipe, and moving the filament segment longitudinally along the mandrel during the winding as the mandrel is rotated to wipe resin from the wound rovings to leave a substantially uniform surface layer of resin on the rovings, the layer being sufficiently thin that it stays on the rovings while the mandrel is rotating, whereby resin is prevented from being slung from the pipe as it is formed.

2. A method as claimed in claim 1 wherein the mandrel is rotated faster than its first critical speed.

3. A method as claimed in claim 1 wherein wiping resin comprises contacting the wound rovings with a plurality of filament segments.

4. A method as claimed in claim 3 wherein the filament segments are substantially parallel.

5. A method as claimed in claim 4 in which the filament segments are substantially uniformly spaced-apart.

6. A method for manufacturing plastic pipe reinforced with fibrous rovings on a mandrel comprising the steps of:
 (a) rotating the mandrel;
 (b) impregnating the rovings with a liquid resin;
 (c) winding at least one layer of the resin coated rovings upon the rotating mandrel; and
 (d) wiping resin from the wound rovings by contacting the rovings with a plurality of substantially parallel spaced-apart filament segments after the rovings are wound onto the mandrel, the angle between the filament segments wiping the rovings and the longitudinal axes of the rovings being wiped being substantially the same for all the rovings, and the filament segments contacting the rovings being substantially parallel to the longitudinal axes of the rovings.

7. A method as claimed in claim 6 wherein successive layers of the rovings are transverse, and the angle between the axes of the filament segments wiping the rovings and the longitudinal axes of the rovings being wiped is substantially constant.

8. A method for manufacturing plastic pipe reinforced with fibrous rovings comprising the steps of:
 (a) coating the rovings with a liquid resin;
 (b) longitudinally carrying the coated rovings to and fro along a rotating mandrel;
 (c) helically winding layers of the rovings on the mandrel so that successive layers are transverse, wherein the combination of the longitudinal motion of the rovings and rotational motion of the mandrel produces the helix; and
 (d) wiping the wound rovings with a plurality of spacedapart, substantially parallel filament segments after the rovings are wound onto the mandrel, the angle between the filament segments wiping the rovings and the longitudinal axes of the rovings being wiped being substantially the same for all the rovings, and the filament segments contacting the rovings being substantially parallel to the longitudinal axes of the rovings.

9. A method as claimed in claim 8 wherein the step of wiping comprises the steps of:
 (a) contacting the wound rovings with a first group of substantially parallel, spaced-apart filament segments only as the rovings are carried along the mandrel in a first direction;
 (b) disengaging the first group of filament segments from the rovings when the direction the rovings are carried switches from the first direction to the opposite direction;
 (c) contacting the rovings with a second group of substantially parallel spaced-apart filament segments only as the rovings are carried along the mandrel in the direction opposite the first direction wherein the second group of segments is not parallel to the first group of filament segments; and
 (d) disengaging the second group of filament segments from the rovings when the direction the rovings are carried switches back to the first direction.

10. A method as claimed in claim 8 comprising the additional steps of:
 (a) collecting resin wiped from the rovings; and
 (b) coating rovings with the collected resin.

11. In apparatus for making plastic pipe reinforced with helical layers of fibrous roving, and which apparatus includes a rotating mandrel upon which the pipe is formed, means for applying liquid resin to the rovings, and a carriage for carrying the rovings to and from along the length of the mandrel as the resin coated rovings are helically wound on the mandrel, the improvement comprising:
 (a) at least two elongated, spaced-apart supporting members, each supporting member having a plurality of circumferential longitudinally spaced grooves;
 (b) a plurality of substantially parallel, spaced-apart filament segments positioned in the grooves; and
 (c) means for holding the filaments in contact with rovings wound on the pipe to wipe resin from the rovings.

12. A machine for manufacturing plastic pipe reinforced with helical layers of fibrous rovings, comprising:
 (a) a rotating mandrel upon which the pipe is formed;
 (b) means for applying liquid resin to the rovings;
 (c) a carriage for carrying the rovings to and fro along the length of the mandrel as the resin coated rovings are helically wound on the mandrel; and
 (d) at least one wiper for removing resin from the rovings after the rovings are wound onto the mandrel to leave a surface layer of resin on the rovings, wherein the wiper comprises a plurality of substantially parallel, spaced-apart filament segments for contacting the rovings, the adjacent layers of rovings being transverse to each other and the angle between the filament segments wiping the rovings and the longitudinal axes of the rovings being wiped being substantially the same for all the rovings, and the filament segments contacting the rovings being substantially parallel to the longitudinal axes of the rovings.

13. A machine as claimed in claim 12 comprising only one pivotally mounted wiper.

14. A machine as claimed in claim 12 comprising a first wiper which removes resin as the carriage moves in one direction and a second wiper which removes resin as the carriage moves in the opposite direction.

15. A machine as claimed in claim 14 in which the first wiper removes resin only as the carriage moves in one direction and the second wiper removes resin only as the carriage moves in the opposite direction.

16. A machine as claimed in claim 14 in which the resin applying means comprises a resin pot having an open top, wherein the resin pot is continuously positioned beneath the point of contact of the rovings and the filament segments.

17. A machine as claimed in claim 14 comprising a first wiper which wipes the rovings as the roving carrying means moves longitudinally in a first direction along the mandrel, and a second wiper which wipes the rovings as the roving carrying means moves longitudinally in the direction opposite to the first direction.

18. A machine as claimed in claim 17 in which the first wiper removes resin only as the carriage moves in one direction and the second wiper removes resin only as the carriage moves in the opposite direction.

19. A machine for manufacturing plastic pipe reinforced with fibrous rovings comprising:
  (a) a rotating mandrel upon which the pipe is formed;
  (b) means for helically winding layers of rovings impregnated with liquid resin onto the mandrel wherein succeeding layers of rovings are transverse;
  (c) a carriage reciprocating longitudinally;
  (d) a first wiper secured to the carriage, the first wiper contacting the rovings as the carriage moves in one direction along the mandrel, the first wiper comprising a plurality of substantially parallel, spaced-apart filament segments;
  (e) a second wiper secured to the carriage, the second wiper comprising a plurality of substantially parallel spaced-apart filament segments, wherein the second wiper contacts the rovings as the carriage moves in the direction opposite the direction the carriage moves when the first wiper contacts the rovings, and wherein the angle between the axes of the filament segments of the second wiper and the longitudinal axes of the rovings when contacted by the second wiper is substantially the same as the angle between the axes of the filament segments of the first wiper and the longitudinal axes of the rovings when contacted by the first wiper; and
  (f) means for repeatedly engaging one of the wipers with the rovings and disengaging the other wiper from the rovings when the carriage reverse its direction of longitudinal movement.

20. A machine as claimed in claim 19 in which the means for engaging and disengaging the wipers with the rovings comprises:
  (a) means for reciprocatingly pulling the carriage in a longitudinal direction, wherein the pulling means travels in a closed loop;
  (b) means for pressing the wipers against the rovings;
  (c) a block mounted on the carriage, wherein the block is secured to the pulling means and the block travels in a direction transverse to the longitudinal movement of the carriage when the pulling means changes its direction of movement;
  (d) a tiltable frame to which the wipers are secured wherein the frame is mounted on the carriage; and
  (e) linkage means connecting the frame to the block, wherein when the block travels in a direction transverse to the longitudinal movement of the carriage, the linkage means forces one of the wipers away from the rovings by overcoming the effect of the pressing means and simultaneously allows the other wiper to contact the rovings.

21. A machine as claimed in claim 20 wherein the pulling means is a chain link.

22. A machine as claimed in claim 20 comprising means for maintaining the block rigidly fixed relative to the axis of rotation of the mandrel as the pulling means travels longitudinally along the carriage.

23. A machine as claimed in claim 20 comprising, in addition:
  (a) at least one vertical guide bar on which the block travels when the pulling means changes direction;
  (b) a detent associated with the guide bar; and
  (c) means attached to the block for reversibly engaging the detent as the pulling means travels in a direction substantially parallel to the axis of rotation of the mandrel so that the block is held rigidly fixed relative to the axis of rotation of the mandrel.

* * * * *

UNITED STATES PATENT AND TRADEMARK OFFICE
CERTIFICATE OF CORRECTION

PATENT NO. : 4,174,243
DATED : November 13, 1979
INVENTOR(S) : GERALD M. MAGARIAN It is certified that error appears in the above-identified patent and that said Letters Patent are hereby corrected as shown below:

Col. 1, line 9, "impregnating" should read --Impregnating--; line 10, after 'uid"', insert --, now abandoned--; line 11, "Reinforcing" should read --Reinforced--; line 13, after 'Mandrel"', insert --, now U.S. Pat. No. 4,149,922, issued April 17, 1979--; Col. 2, line 15, "is" should read --in--; Col. 4, line 44, "3-'" should read --3-3--; Col. 5, line 2, before "a" insert --and--; line 11, "Lacron" should read --Dacron--; line 26, after "first" insert --end--; line 68, "C-chaped" should read --C-shaped--; Col. 7, line 20, "suppots" should read --supports--; Col. 8, line 6, cancel "first"' Col. 9, line 59, "directon" should read --direction--; Col. 12, line 13, after "after" insert --it--; Col. 13, line 55 (claim 8, line 12), "spacedapart" should read --spaced-apart--; Col. 14, line 23 (claim 11, line 5, "from" should read --fro--; Col. 16, line 1 (claim 19, line 29), "reverse" should read --reverses--.

Signed and Sealed this

Twenty-fourth Day of June 1980

[SEAL]

Attest:

SIDNEY A. DIAMOND

Attesting Officer

Commissioner of Patents and Trademarks